United States Patent
Hauck

(10) Patent No.: US 7,058,732 B1
(45) Date of Patent: Jun. 6, 2006

(54) METHOD AND APPARATUS FOR AUTOMATIC DETECTION OF A SERIAL PERIPHERAL INTERFACE (SPI) DEVICE MEMORY SIZE

(75) Inventor: Lane Hauck, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 872 days.

(21) Appl. No.: 09/778,233

(22) Filed: Feb. 6, 2001

(51) Int. Cl.
*G06F 3/00* (2006.01)

(52) U.S. Cl. .............................. 710/15; 710/16; 710/19; 710/33; 710/36; 710/62; 713/1

(58) Field of Classification Search ................... 710/15, 710/16, 19, 33, 36, 62, 1, 32; 713/1
See application file for complete search history.

(56) References Cited

U.S. PATENT DOCUMENTS

| | | | | |
|---|---|---|---|---|
| 5,826,068 A | * | 10/1998 | Gates .......................... | 713/600 |
| 5,920,708 A | * | 7/1999 | Gates et al. ................. | 710/305 |
| 5,995,424 A | * | 11/1999 | Lawrence et al. ........... | 365/201 |
| 6,055,600 A | * | 4/2000 | Nguyen et al. .............. | 711/100 |
| 6,230,274 B1 | * | 5/2001 | Stevens et al. .............. | 713/320 |
| 6,298,006 B1 | * | 10/2001 | Reohr, Jr. et al. ........... | 365/236 |
| 6,370,642 B1 | * | 4/2002 | Chiang et al. ................. | 713/1 |
| 2002/0010830 A1 | * | 1/2002 | Nizar et al. .................. | 711/105 |

* cited by examiner

*Primary Examiner*—Kim Huynh
*Assistant Examiner*—Angel L. Casiano
(74) *Attorney, Agent, or Firm*—Wagner, Murabito & Hao LLP

(57) ABSTRACT

A method and apparatus for automatically detecting the memory size of a serial peripheral interface (SPI) device. Specifically, the present invention describes an SPI interface circuit including a memory controller chip, an EEPROM, a sensing circuit, and a pulldown resistor. In one embodiment, a "READ" command from the controller to the SPI device is sent in a first byte of information transferred between the controller and SPI device. The data Input/Output (D-IO) pin is then driven low for the second byte of information. Next, the D-IO pin is floated and the pin assumes a logic "0" level due to a pulldown resistor. Subsequently, a sensing circuit can detect when and if a non-zero data value passes from the SPI device to the memory controller chip to determine the memory size of the SPI device or the absence of an SPI device.

27 Claims, 8 Drawing Sheets

800

START

↓

SEND THE READ COMMAND BYTE.
810

↓

DRIVE THE DATA INPUT/OUTPUT PIN LOW FOR EIGHT SERIAL CLOCK PULSES.
820

↓

FLOAT THE DATA INPUT/OUTPUT PIN.
830

↓

WEAKLY PULL DOWN THE DATA INPUT/OUTPUT PIN TO A LOGIC "0" LEVEL.
840

↓

DETECT THE PRESENCE OF ZERO OR NON-SERO BYTE VALUES AT THE DATA INPUT/OUTPUT PIN OF THE CONTROLLER TO DETERMINE THE PRESENCE OF A SMALL, LARGE, OR LARGER SPI EEPROM, OR ALTERNATIVELY, THE ABSENCE OF AN SPI EEPROM.
850

↓

END

FIGURE 8

METHOD AND APPARATUS FOR AUTOMATIC DETECTION OF A SERIAL PERIPHERAL INTERFACE (SPI) DEVICE MEMORY SIZE

BACKGROUND OF THE INVENTION

1. Field of the Invention

The present invention relates to the field of serial peripheral interface devices.

2. Related Art

The serial peripheral interface (hereinafter referred to as "SPI") bus can provide a synchronous serial data connection between SPI devices and/or microprocessors. One particular usage of the SPI bus includes a single chip microprocessor with limited non-volatile memory but with internal random access memory for program storage. The microprocessor is connected to an electrically-erasable programmable read-only memories (hereinafter referred to as "EEPROMs") via an SPI bus. Upon booting up the device containing the microprocessor chip, the EEPROM can transfer its non-volatile information to the microprocessor in order to program the device for use in a universal serial bus (hereinafter referred to as "USB") communication system.

However, before reading the EEPROM, the address counter in the EEPROM must be set to a certain address in order to access the information stored on the EEPROM correctly. The memory controller sends out a "READ" command which starts at a certain address, cleared to zero in most cases. Thus, the memory controller must recognize what size of EEPROM is attached in order to send out the correct start address. Depending on the size of the EEPROM, the address may be one, two, three bytes, or larger.

Electrically-erasable programmable read-only memories are available with a variety of serial bus interfaces. For example, Microchip, Atmel, ST Microelectronics, Catalyst Semiconductor and other manufacturers offer EEPROM devices in various densities and interfaces. Such interfaces are typically characterized as "2-wire" or "3-wire". The SPI (Serial Peripheral Interface) bus is a "3-wire" interface, utilizing a data in terminal, a data out terminal, and a serial clock terminal. A fourth "chip select" terminal is required to activate the device, making SPI actually a "4-wire" interface. The SPI bus offers advantages over other serial interfaces such as a higher rate of data transfer. Additionally, the SPI bus offers a more secure memory-write mechanism that has better noise immunity to false writes than other communication buses.

SPI EEPROMs are offered in various densities of memory. For example the Atmel AT25010 is 1 Kilobit, organized 128×8, and the Atmel AT25640 is 64 Kilobits, organized 8K×8. For example, in systems that support the above two sizes of EEPROMs, a fifth "size" or mode pin is required to allow the memory controller to recognize what size of EEPROM is connected. Once the correct size of SPI device is recognized, the memory controller can generate the correct series of signals for each of the two above memory sizes in order to coordinate the flow of information to and from the SPI device. For an SPI bus, this makes the total interface a "5-pin" interface.

A particular problem with using a mode pin involves human error. Since the mode pin is a user settable switch, the mode pin could be jumpered or set incorrectly. In this case, the memory controller would send out the incorrect signal to the EEPROM and at the very least not allow the EEPROM to transfer useable information to the microprocessor. The USB device containing the microprocessor thus would not be enabled.

Moreover, pin usage on the microprocessor is at a premium. It is desirable in systems that use SPI EEPROMs to conserve the number of interface pins used to read and write the EEPROM.

Thus, it would be advantageous to provide a more reliable way to coordinate the flow of information in and out of serial SPI devices. Also, it would be advantageous to provide a way to conserve the number of interface pins used to coordinate the flow of information in and out SPI devices.

SUMMARY OF THE INVENTION

The present invention discloses a method and system for detecting memory size of a serial peripheral interface device. The present invention more reliably coordinates the flow of information in and out of serial SPI devices by removing the human factor in setting a mode pin on an SPI interface. The present invention also conserves the number of interface pins used to coordinate the flow of information into and out of SPI devices by requiring only three controller SPI interface pins.

These and other objects and advantages of the present invention will no doubt become obvious to those of ordinary skill in the art after having read the following detailed description of the preferred embodiments which are illustrated in the various drawing figures.

The present invention discloses a method and system for automatically detecting the memory size of a serial peripheral interface (SPI) device. Specifically, one embodiment of the present invention describes an SPI interface circuit including a memory controller chip, an SPI device, a sensing circuit, and a pulldown resistor. The serial input (SI) pin and serial output (SO) pin located on the SPI device are tied together to form a bi-directional signal. A pulldown resistor is also coupled to the SI and SO pins.

A three pin interface through the memory controller chip is described in one embodiment of the present invention. The memory controller chip includes a serial clock pin, a chip select pin, and a data Input/Output (D-IO) pin. The SPI device includes a serial clock pin, a chip select pin, a SI pin and a SO pin, where the SI and SO pins are tied together. The memory controller chip is coupled to the SPI device by first coupling the two serial clock pins, then coupling the two chip select pins, and finally coupling the D-IO pin from controller to the tied together SI and SO pins as well as to the pulldown resistor.

In another embodiment, a "READ" command from the memory controller chip is sent to the SPI device in a first byte of information through the D-IO pin. The D-IO pin is then driven low for a second byte of information. Next, the D-IO pin is floated and the pin assumes a logic "0" level due to a pulldown resistor. Subsequently, a sensing circuit can detect when and if a non-zero data value passes from the SPI device to the memory controller chip to determine the presence or absence of an SPI device, and if one is present, the memory size of the SPI device.

BRIEF DESCRIPTION OF THE DRAWINGS

FIG. 8 is a flow diagram illustrating steps in a computer implemented method for automatically detecting the memory size of an SPI device, in accordance with an embodiment of the present invention.

DETAILED DESCRIPTION OF THE INVENTION

Figure 1:
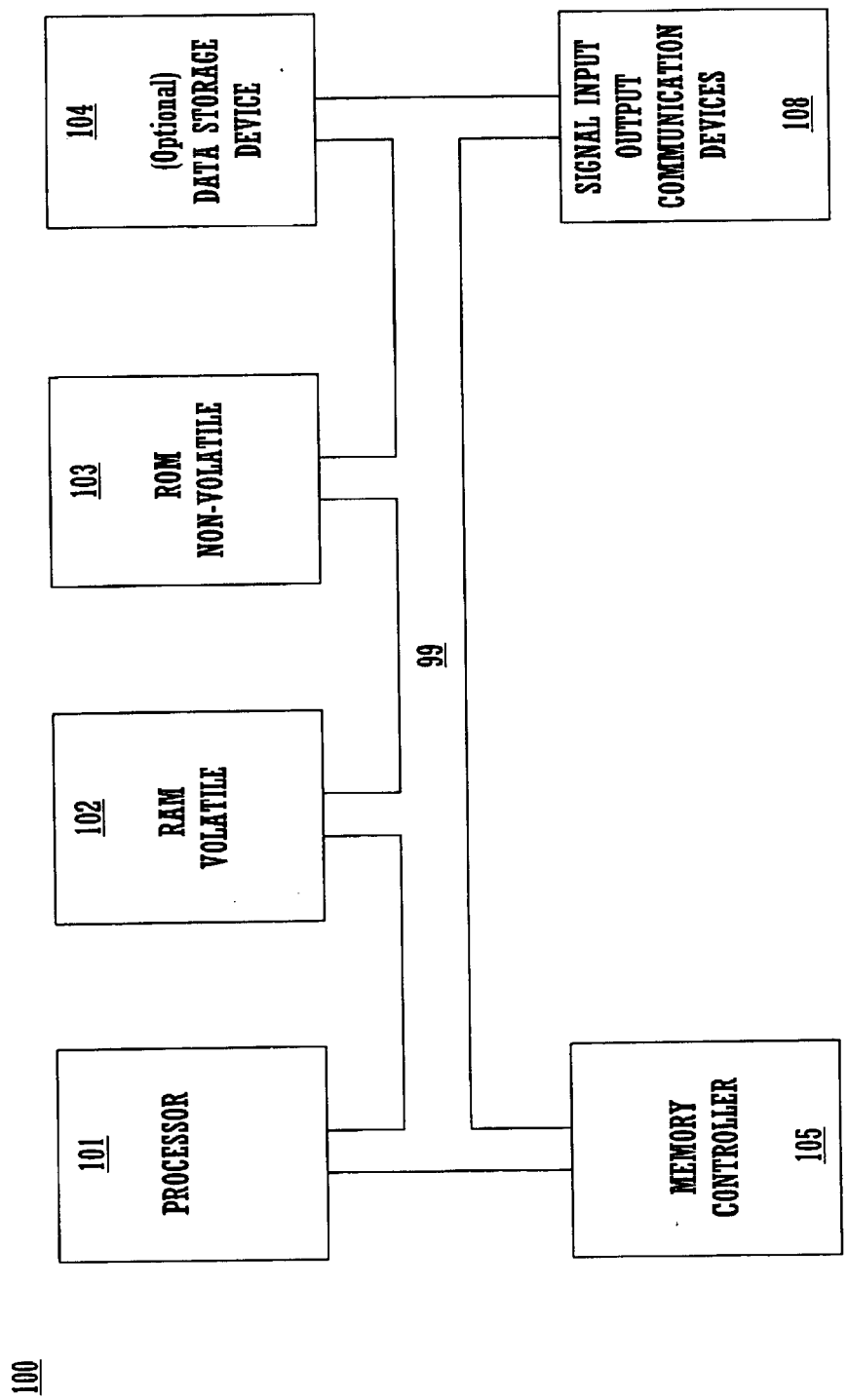
FIG. 1 is a logical block diagram of a computer system in accordance with an embodiment of the present invention.

Reference will now be made in detail to the preferred embodiments of the present invention, a method and system for automatically detecting the memory size of an SPI device, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Referring now to FIG. 1, portions of the present electronic system are comprised of computer-readable and computer-executable instructions which reside, for example, in computer-readable media of an electronic system. FIG. 1 is a block diagram of exemplary interior components of an exemplary electronic system 100 upon which embodiments of the present invention may be implemented. It is appreciated that the exemplary electronic system 100 of FIG. 1 is only exemplary and that the present invention can operate within a number of different electronic systems including cable set top boxes, modems, camcorders, personal digital assistants, general purpose networked computer systems, embedded computer systems, and stand alone electronic systems such as a cellular telephone or a pager, and the like.

Further, it is appreciated that electronic system 100 may operate within a networked communication system with other electronic devices. The communication system may operate under a number of communication protocols, such as the universal serial bus (USB) communication protocol.

FIG. 1 illustrates circuitry of an exemplary electronic system or computer system 100. Exemplary computer system 100 includes an address/data bus 99 for communicating information, a central processor 101 coupled with the bus 99 for processing information and instructions, a volatile memory 102 (e.g., random access memory (RAM), static RAM dynamic RAM, etc.) coupled with the bus 99 for storing information and instructions for the central processor 101, and a non-volatile memory 103 (e.g., read only memory (ROM), programmable ROM, flash memory, EPROM, EEPROM, etc.) coupled to the bus 99 for storing static information and instructions for the processor 101. An optional data storage device 104 is also coupled to the bus 99.

In one embodiment of the present invention, bus 99 can be a serial communication bus, such as the serial peripheral interface (hereinafter referred to as "SPI") communication bus.

With reference still to FIG. 1, exemplary computer system 100 also includes a memory controller to coordinate the flow of information between the processor 101 and the non-volatile ROM 103. In some embodiments of the present invention, the memory controller can be integrated within the processor 101. Also, an optional signal Input/Output device 108 which is coupled to bus 99 for providing a communication link between computer system 100 and a network environment is described. As such signal Input/Output device 108 enables central processor unit 101 to communicate with other electronic systems coupled to a communication network, such as a USB network.

Automatic Detection of Memory Size for an SPI Device

This disclosure describes a method and apparatus for automatically detecting the size of an SPI device, specifically an SPI EEPROM. It is appreciated that the invention could be implemented in other communication bus systems for detecting the size of a connected device. Also, although the SPI EEPROM is primarily discussed, the invention is well suited for use with any SPI device having memory storage capabilities.

In one embodiment of the present invention, a typical chip type that must accommodate two different EEPROM sizes, small and large, is a USB peripheral chip that contains internal RAM for program storage, such as a microprocessor. When a chip of this type powers on, it utilizes an external EEPROM for two different applications, each of which uses a different density of memory size.

In the first case, a small amount of data (8 bytes or less) is loaded onto the USB peripheral chip to customize the USB device as provided by the particular manufacturer. Information included can be vendor identification, product identification, etc. The EEPROM that contains this information is a "small" EEPROM of approximately 16 to 512 bytes.

In the second case, a large amount of data (approximately 8 kilobytes) is loaded into the internal random access memory of the USB peripheral chip for code execution. The EEPROM that contains this information is a "large" EEPROM of up to approximately 64 kilobytes of memory.

In both the small and large EEPROMs, the EEPROM sequential addresses are required to be read starting at address zero. A memory controller coordinates the flow of information into and out of the SPI device.

Figure 2:
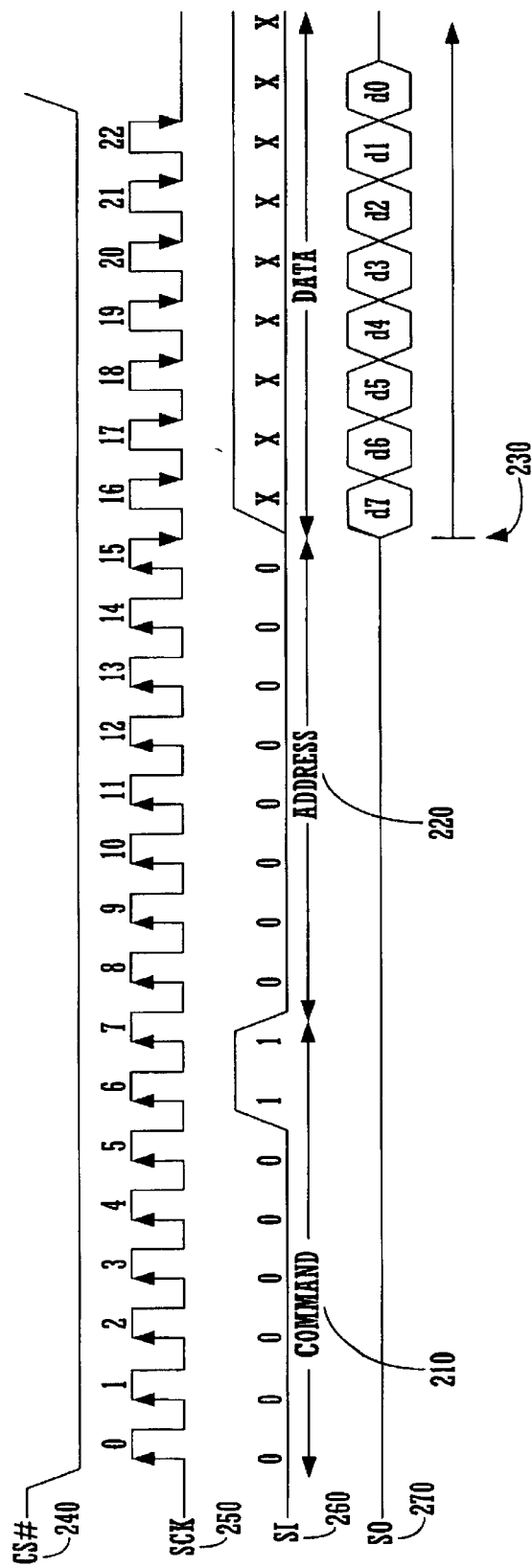
FIG. 2 illustrates a signal waveforms of a serial peripheral interface (SPI) bus interface for a "small" EEPROM in accordance with an embodiment of the present invention.

FIG. 2 illustrates the waveforms for an SPI signal interface for a "small" EEPROM in accordance with one embodiment of the present invention. This signal interface is valid for EEPROM organizations up to 512 bytes. The memory controller 105 coupled to the small EEPROM reads small EEPROM data using three stages: 1) command stage, 2) address stage, and 3) data stage.

The controller 105 connected to the small EEPROM drives the serial clock (SCK) as represented by SCK waveform 250 of FIG. 2. Each cycle of the serial clock causes the data registers to shift both in and out one bit. Correspondingly, the controller 105 strobes data into the small EEPROM on the serial input (SI) pin 424 of FIG. 4 using the rising edge of the serial clock, and it reads small EEPROM output data on the SO pin 426 of FIG. 4 on the falling edge of the serial clock. This is indicated by the arrows in the serial clock waveform as represented on SCK waveform 250.

Additionally, a chip select (CS#) signal 240 enables the small EEPROM when the signal is low to initiate the transfer of data and marks the end of operation when the signal is high. The controller 105 transfers the CS# signal to the CS# pin 427 of FIG. 4 to initiate a transfer (CS=0) and to terminate a transfer (CS=1). The controller may continue to read successive bytes by continuing to issue groups of eight serial clock pulses while holding CS=0. An address counter in the small EEPROM automatically increments the address for each eight serial clock pulses.

Figure 4:
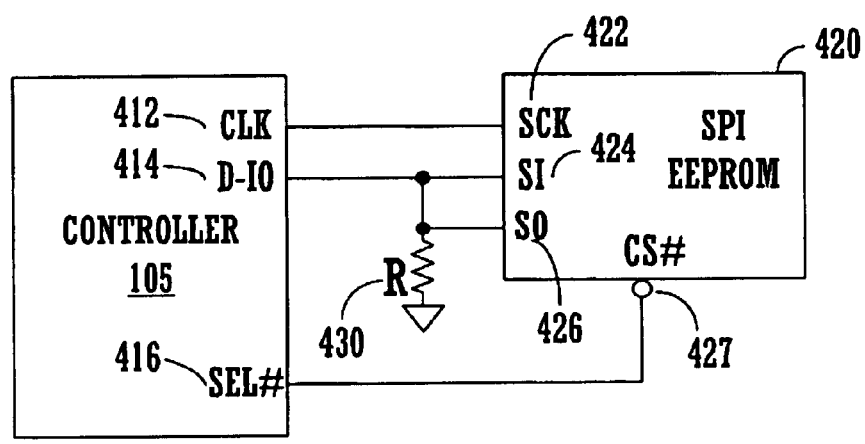
FIG. 4 illustrates a block diagram of an SPI interface circuit in accordance with an embodiment of the present invention.

In the command stage 210 as illustrated in FIG. 2, the controller 105 sends a "READ" command over the SI waveform 260 on the small EEPROM. The SI waveform 260 corresponds to the signal being transferred to the small EEPROM through the SI pin 424 as shown in FIG. 4. The "READ" command is included within the first byte of information that passes between the controller and the small EEPROM. The SPI bus communicates over a bit-wide format where all information is transferred in 8-bit words. The "READ" command 210 consists of the following eight bits: "00000011" (clock cycles 0–7) in accordance with the present embodiment.

In the address stage 220 as illustrated in FIG. 2 of the present embodiment, the controller needs to begin reading the small EEPROM at address zero, as is always the case for the USB chip requirements. Therefore, the controller 105 sends a nine-bit address of "000000000" over the SI waveform 260 to clear the address counter in the small EEPROM. For 512 byte, or small EEPROMs, the bit represented by the fourth clock time is used for the ninth address bit, shown as zero in FIG. 2. The first eight bits of the address is included with the second byte of information (clock cycles 8–15) that passes between the controller and the small EEPROM.

In response to the READ command, the small EEPROM begins clocking out data from the zero address. Consequently, the controller 105, in the data stage 230 as illustrated in FIG. 2 of the present embodiment, reads the first bit "d0" of information (at address zero in the small EEPROM) coming from the small EEPROM serial output (SO) pin on the falling edge of the 15th SCK pulse as shown on the SO waveform 270. The SO waveform 270 shows data bits "d0", "d2", "d3", etc.

Figure 3:
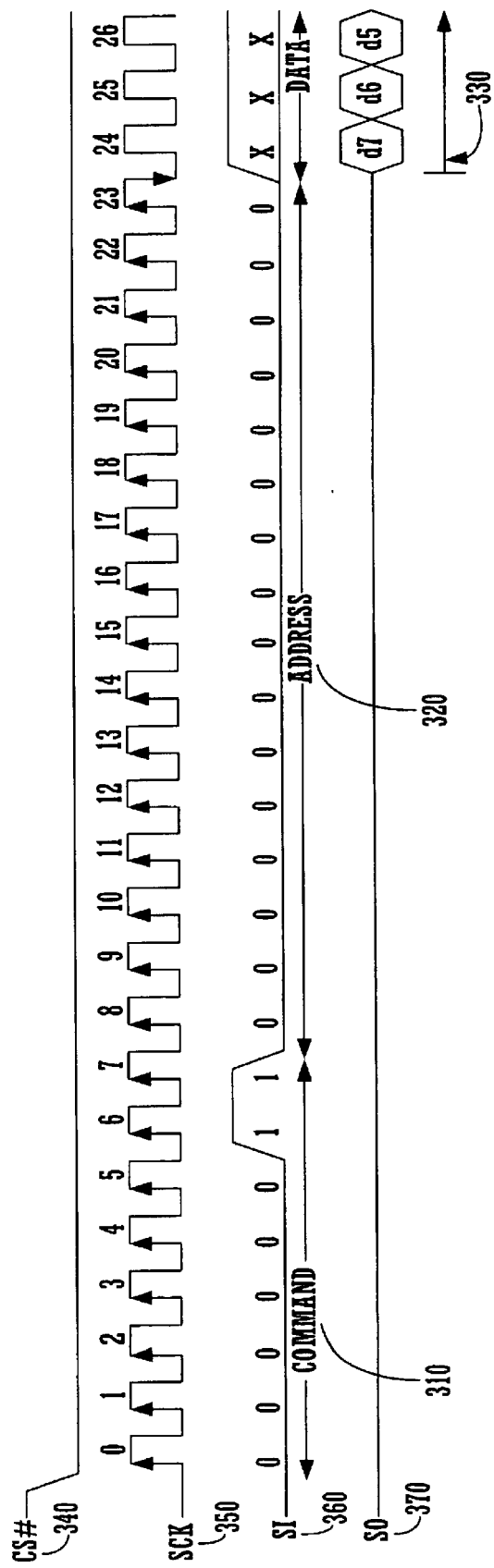
FIG. 3 illustrates signal waveforms of an SPI interface for a "large" EEPROM in accordance with an embodiment of the present invention.

FIG. 3 illustrates the waveforms for an SPI interface for a "large" EEPROM, in accordance with one embodiment of the present invention. This interface is valid for EEPROM organizations of, approximately, 1 Kilobyte to 64 Kilobytes.

As discussed previously, the controller 105 connected to the large EEPROM drives the serial clock (SCK) as represented by SCK waveform 350 of FIG. 3 in the present embodiment. Each cycle of the serial clock causes the data registers to shift both in and out one bit. Correspondingly, the controller 105 strobes data into the large EEPROM on the SI pin 424 of FIG. 4 using the rising edge of the serial clock, and it reads large EEPROM output data on the SO pin 426 of FIG. 4 on the falling edge of serial clock. This is indicated by the arrows in the serial clock waveform as represented on SCK waveform 350.

Additionally, a chip select (CS#) signal 340 enables the large EEPROM when the signal is low to initiate the transfer of data and marks the end of operation when the CS# signal is high in the present embodiment. The controller 105 transfers the CS# signal waveform 340 to the CS# pin 427 to initiate a transfer (CS=0) and to terminate a transfer (CS=1). The controller 105 may continue to read successive bytes by continuing to issue groups of eight serial clock pulses while holding CS=0. An address counter in the large EEPROM automatically increments the address for each eight serial clock pulses.

The memory controller 105 coupled to the large EEPROM reads large EEPROM data using the same three stages as described above for a small EEPROM FIG. 2. In the command stage 310 as illustrated in FIG. 3, the controller 105 sends a "READ" command over the SI waveform 360 to the large EEPROM. The SI waveform 360 corresponds to the signal being transferred to the large EEPROM through the SI pin 424 as shown in FIG. 4. The "READ" command is included within the first byte of information that passes between the controller and the large EEPROM. The SPI bus communicates over a bit-wide format where all information is transferred in 8-bit words. The "READ" command 310 consists of the following eight bits: "00000011" (clock cycles 0–7) in accordance with the present embodiment.

In the address stage 320 as illustrated in FIG. 3 of the present embodiment, the controller 105 needs to begin reading the large EEPROM at address zero, as is always the case for the USB chip requirements. However the "address" stage 320 encompasses sixteen bits instead of eight to accommodate the larger address space. Therefore, the memory controller 105 coupled to a large EEPROM needs to drive a 16-clock (clocks 8–23) address stage 320 rather than the 8-clock address stage 220 (clocks 8–15) required by the small EEPROM. Therefore, the controller 105 sends a 16 bit address of "0000000000000000" over the SI waveform 360 to clear the address counter in the large EEPROM. Although clearing the address counter is the most common requirement, any arbitrary address may be sent over the SI pin by modifying the waveform in the address stage 320 accordingly in other embodiments of the present invention.

After the controller sends the 16 address bits, it begins clocking in data during a data stage 330 in the present embodiment. However, the controller begins the transfer of data from the large EEPROM on the falling edge of the 23rd serial clock pulse as shown in SO waveform 370, and not the 15th serial clock pulse for a small EEPROM as shown in SO waveform 270 of FIG. 2.

By comparing FIG. 2 and FIG. 3 it is apparent that a controller 105 attached to an SPI EEPROM must accommodate the two different EEPROM sizes needs to produce two different signals in order to properly clock data to and from the EEPROM. Specifically, the controller needs to clock in a different number of clock pulses when strobing the address into the EEPROM. Additionally, the controller, such as memory controller 105, must begin to accept the EEPROM data at different clock cycles: the sixteenth clock cycle for a small EEPROM, and the twenty-fourth clock cycle for a large EEPROM.

In one embodiment of the present invention, the controller 105 is enhanced to automatically detect which EEPROM type is attached. Further, the present embodiment applies a common method to further reduce the final SPI interface on the controller 105 to three pins, thereby saving a device pin on the controller. FIG. 4 shows the controller pins as the clock pin 412, data Input/Output (D-IO) pin 414, and the chip select pin 416.

A simple method for accommodating the two EEPROM types would be to add a "mode" pin to the controller. This pin would instruct the controller which of the two waveforms, as illustrated in FIG. 2 or 3, to use to communicate with the EEPROM. However, this method requires that a bit be preset indicating the type of EEPROM and/or a jumper to be correctly preset to a mode pin. The present embodiment overcomes the human element and its potential for error in setting a mode pin to indicate which EEPROM type is attached to the controller.

The present embodiment takes advantage of one characteristic of an SPI EEPROM as shown in FIG. 4. Commercially available SPI EEPROMs communicate in a "half-duplex" operation. In half duplex, the EEPROM either accepts data over the SI (serial input) pin or sends data over the SO (serial output) pin, but never both at the same time. Also, when the SO pin is not driving, it floats.

Therefore, as shown in FIG. 4, it is feasible directly to connect the SI pin 424 and SO 426 pins together on SPI EEPROM 420, creating a single bi-directional signal and saving an interface pin. At this point, the present embodiment leaves a four-wire interface in systems that must accommodate small and large EEPROMs.

Further, the present embodiment enhances the controller 105 such that automatic detection of the memory size of the SPI device in FIG. 4 is possible. This method of automatic detection further saves a "size" pin and therefore reduces the interface to the aforementioned three pins. FIG. 4 illustrates an SPI interface which uses only three controller pins, and provides a method for automatically detecting the EEPROM size.

As discussed previously, the EEPROM SI pin 424 and SO pin 426 are tied together to form a single bi-directional data signal, which is tied to the controller D-IO pin 414 and a pulldown resistor "R" 430. The controller 105 also supplies the serial clock from the controller clock pin 412 to the SPI EEPROM SCK pin 422. Also, a chip select signal is sent to the SPI EEPROM from the controller.

Figure 5:
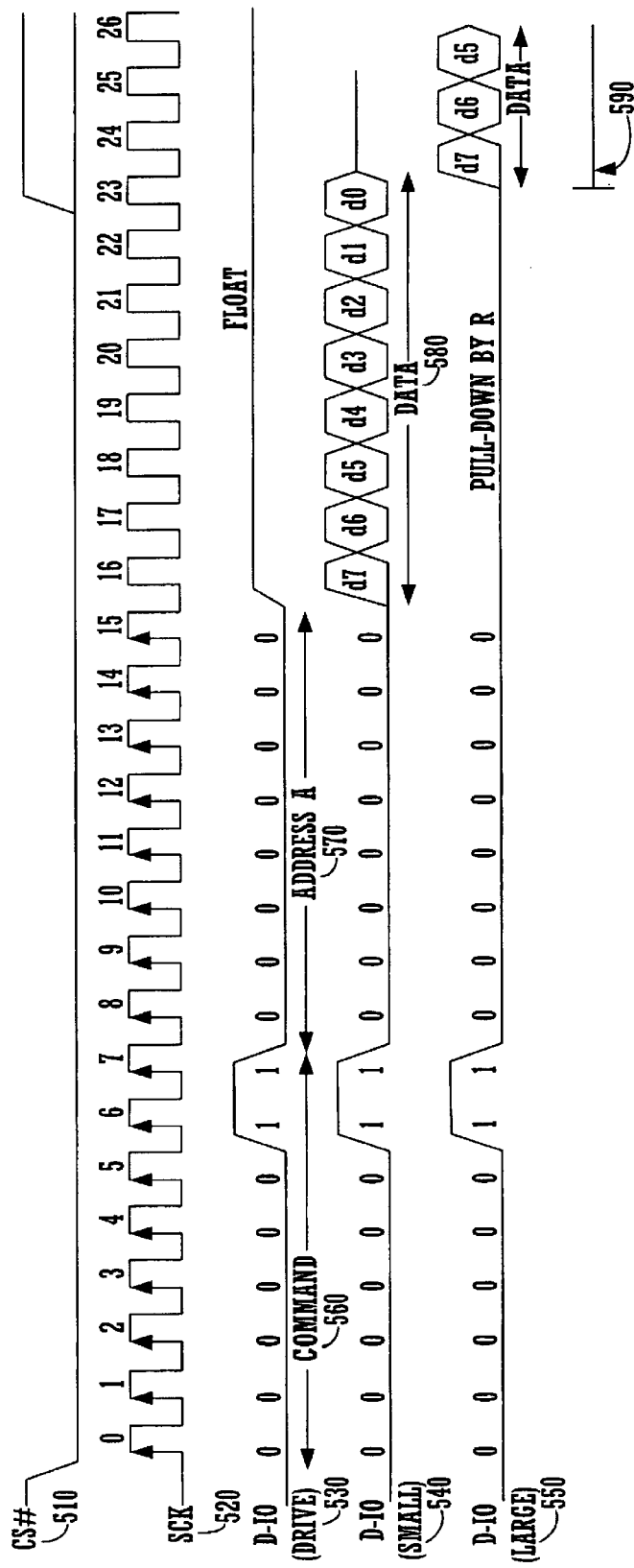
FIG. 5 illustrates signal waveforms of an SPI interface using the SPI interface circuit in accordance with an embodiment of the present invention.

FIG. 5 illustrates the waveforms for an SPI interface implementing a method for automatically detecting the memory size of a coupled SPI device in an SPI interface circuit, in accordance with one embodiment of the present invention.

FIG. 5 illustrates how a memory controller 105 through the SPI interface circuit 400 automatically detects between two memory sizes of the coupled SPI device, such as SPI EEPROM 420. The two sizes are a small EEPROM of up to 512 bytes, and a large EEPROM between 1–64 kilobytes. The memory controller 105 uses the same three stages as described previously for the transfer of data: a command stage, an address stage, and a data stage.

The controller 105 of FIG. 4 drives the serial clock (SCK) as represented by SCK waveform 520 of FIG. 5 in the present embodiment. Each cycle of the serial clock causes the data registers to shift both in and out one bit. Correspondingly, the controller 105 strobes data into the SPI device, SPI EEPROM 420, on the SI pin 424 of FIG. 4 using the rising edge of the serial clock, and it reads SPI EEPROM 420 output data on the SO pin 426 on the falling edge of the serial clock.

Additionally, a chip select (CS#) signal waveform 510 enables the SPI EEPROM 420 when the signal is low to initiate the transfer of data and marks the end of operation when the CS# signal is high, in the present embodiment of the invention. The controller 105 transfers the CS# waveform 510 to the CS# pin 427 to initiate a transfer (CS=0) and to terminate a transfer (CS=1). The controller 105 may continue to read successive bytes by continuing to issue groups of eight serial clock pulses while holding CS=0. An address counter in the SPI EEPROM 420 automatically increments the address for each eight serial clock pulses.

In FIG. 5, the controller 105 begins by sending the READ command byte as illustrated in the data Input/Output (D-IO) waveform 530. The READ command is included within the first byte of information that passes between the controller 105 and the SPI EEPROM 420. The READ command 560 consists of the following eight bits: "00000011" (clock cycles 0–7) in accordance with the present embodiment.

In the address stage, the controller 105 needs to begin reading the SPI EEPROM 420 at address zero, as is always the case for the USB chip requirement. However, at this point, the memory size of the SPI EEPROM 420 is unknown. What is known is that the first 8 bits of the address are zero. Thus, the controller 105 then begins an address phase by driving the D-IO pin 414 low for eight serial clock pulses (clock cycles 8–15) as shown in FIG. 5. This is shown as address 570 where the controller 105 sends "00000000" over the D-IO waveform 530 to the SPI EEPROM 420.

Continuing with FIG. 5, the controller then floats the D-IO pin 414, as shown in the D-IO(drive) waveform 530. Due to the presence of resistor 430, the D-IO network at D-IO pin 414 is weakly pulled down to a logic "0" level in the present embodiment.

If a small SPI EEPROM is connected, the SPI EEPROM 420 will drive its SO pin 426 with the first data byte starting with the falling edge of clock 15 as shown by the "D-IO (small)" waveform 540. This drive signal overcomes the weak pulldown resistor 430. As such, D-IO pin 424 toggles according to the data value in the first EEPROM byte.

A sensing circuit in the controller detects the presence of a non-zero value during clocks 15–22, which indicates that a small EEPROM is connected. Accordingly, the controller 105 has the intelligence to recognize clocks 15–22 as the first EEPROM byte of data (d7-d0 in waveform 540). Thus, the data 580 received can be properly processed by the memory controller 105.

If a large EEPROM is connected, the SPI EEPROM 420 does not respond with data on..its. SO pin 426 during clocks 15–22 since it is expecting the last 8 bits of the 16-bit address during this time. Accordingly, during this time the SPI EEPROM 420 floats its SO pin 426. The controller 105 detects a series of eight "logic 0" values due to the pulldown R 430 during clock cycles 15–22 as shown in the D-IO (large) waveform 550.

At this point, the controller 105 now knows that a small EEPROM is not connected since the eight bits during clocks 15–22 are zero. If a small EEPROM were connected the eight bits during clocks 15–22 would be non-zero.

If a large SPI EEPROM is connected, the SPI EEPROM 420 will drive its SO pin 426 with the first data byte starting with the falling edge of clock 23 as shown by the "D-IO (large)" waveform 550. This drive signal overcomes the weak pulldown resistor 430. As such, D-IO pin 424 toggles according to the data value in the first EEPROM byte.

A sensing circuit in the controller 105 detects the presence of a non-zero value during clocks 23–30, which indicates that a large EEPROM is connected. Accordingly, the controller 105 has the intelligence to recognize clocks 23–30 as the first EEPROM byte of data (d7–d0 in-waveform 550). Thus, the data 590 received can be properly processed by the memory controller 105.

The method as illustrated in FIG. 5 assumes that the first byte of data coming from the SPI EEPROM 420 is non-zero, a situation that is easily arranged. Thus, the EEPROM type, small or large, is automatically accommodated by the controller without requiring a mode pin.

In another embodiment of the present invention, some applications may require the determination of the absence of an SPI EEPROM 420 in the SPI interface circuit 400. For example in the EZ-USB family of parts, control logic in the chip takes different actions depending on the presence or absence of an external EEPROM when the chip is powered on or reset.

The EZ-USB chip checks for the presence of an EEPROM by examining whether the first byte of information from the EEPROM is equal to a predefined non-zero "Tag" byte. If the EEPROM is absent or not detected, the controller instructs the EZ-USB chip to enumerate using an internal, fixed set of identification bytes.

On the other hand, if an EEPROM is detected, and the first byte in the EEPROM is a valid first type of non-zero tag value (for example 0×B0 or 0×C0), the controller continues to read bytes from the EEPROM which represent custom USB identification bytes. If the first byte in the EEPROM has a valid second type of non-zero tag value (for example 0×B2 or 0×C2), the controller reads further EEPROM bytes and loads them into internal RAM to be used as microprocessor firmware.

As previously mentioned, it is easily arranged to have a non-zero first EEPROM byte in order for the controller to recognize that an EEPROM is coupled to the SPI interface circuit. In this example the first EEPROM byte must be one of the four aforementioned non-zero values to be considered valid for the EZ-USB application.

Figure 6:
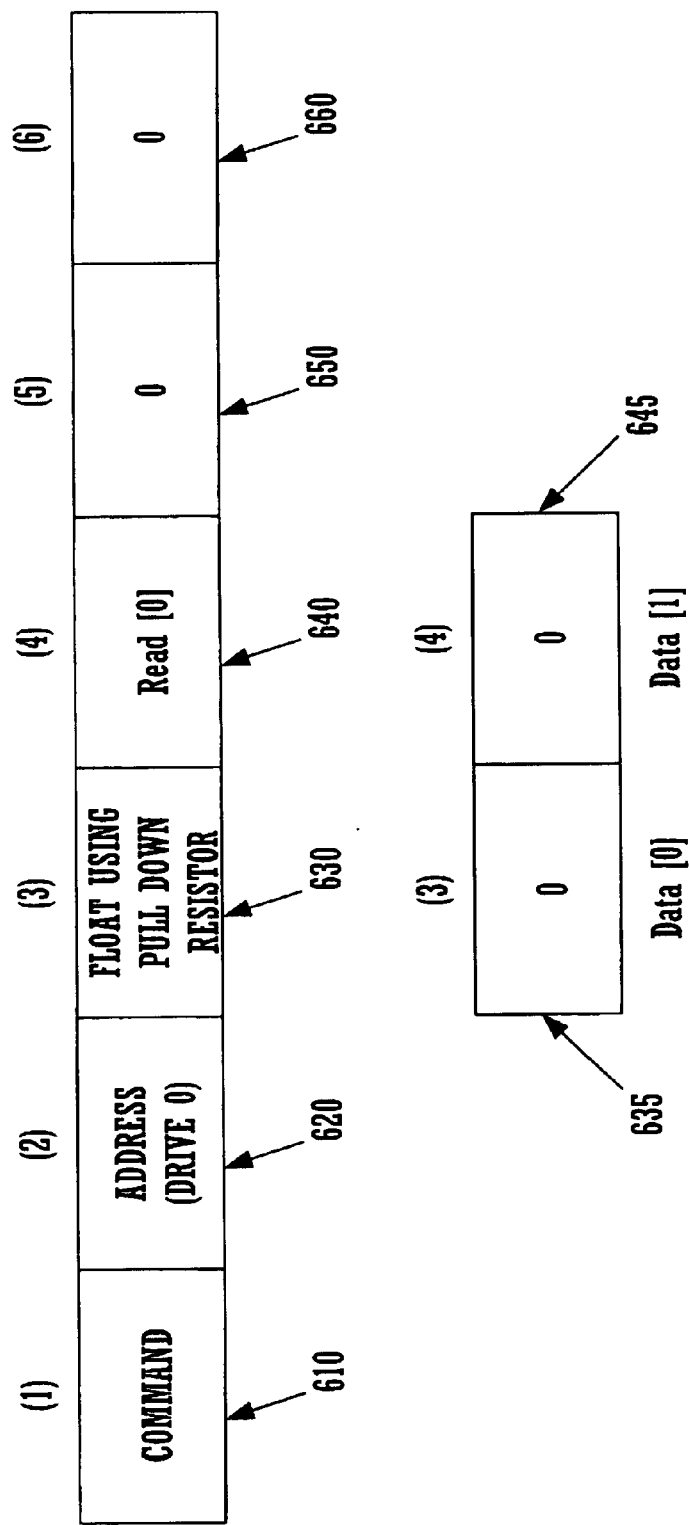
FIG. 6 illustrates a block diagram of signal waveforms of an SPI interface when detecting the absence of an SPI device in accordance with an embodiment of the present invention.

FIG. 6 illustrates the SPI bus values when an EEPROM is absent that show the method for detecting the absence of an SPI EEPROM, in accordance with one embodiment of the present invention. Each of the blocks represents eight SCK clocks cycles, or one byte of information transferred over the bi-directional data bus.

The SPI controller 105 issues the command, a READ command, in the first byte (1) 610 in the present embodiment. The SPI controller 105 then issues the first 8 bits of the address (00000000) in the second byte (2) 620. The SPI controller 105 then floats the bus for the third byte (3) 630. Since the SPI device is absent, the controller detects eight zero bits during the third byte (3) 630 as shown in data 635. Thus, the signal at the D-IO pin 414 assumes a logic 0 state due to the pulldown resistor 430.

At this point, the signals transmitted over the data bus have met the same criteria for detecting a large EEPROM. The intelligence in the controller first assumes that bytes (2) 620 and byte (3) 630 represent a 16-bit address and sets up the controller 105 to reads the fourth byte (4) 640 as the first data byte of a large SPI EEPROM.

However, since the SPI EEPROM is absent, the controller also reads a zero byte during the fourth byte (4) 640 as shown in data 645. A zero byte does not correspond to one of the pre-defined non-zero "tag" bytes and the controller 105 has the intelligence to understand that the SPI EEPROM or SPI device is absent. Thus, in the case of a EZ-USB chip, the controller 105 instructs the EZ-USB chip to enumerate using internal values as in the previous example. Byte (5) 650 and byte (6) 660 would also be zero since the SPI device is absent.

Figure 7:
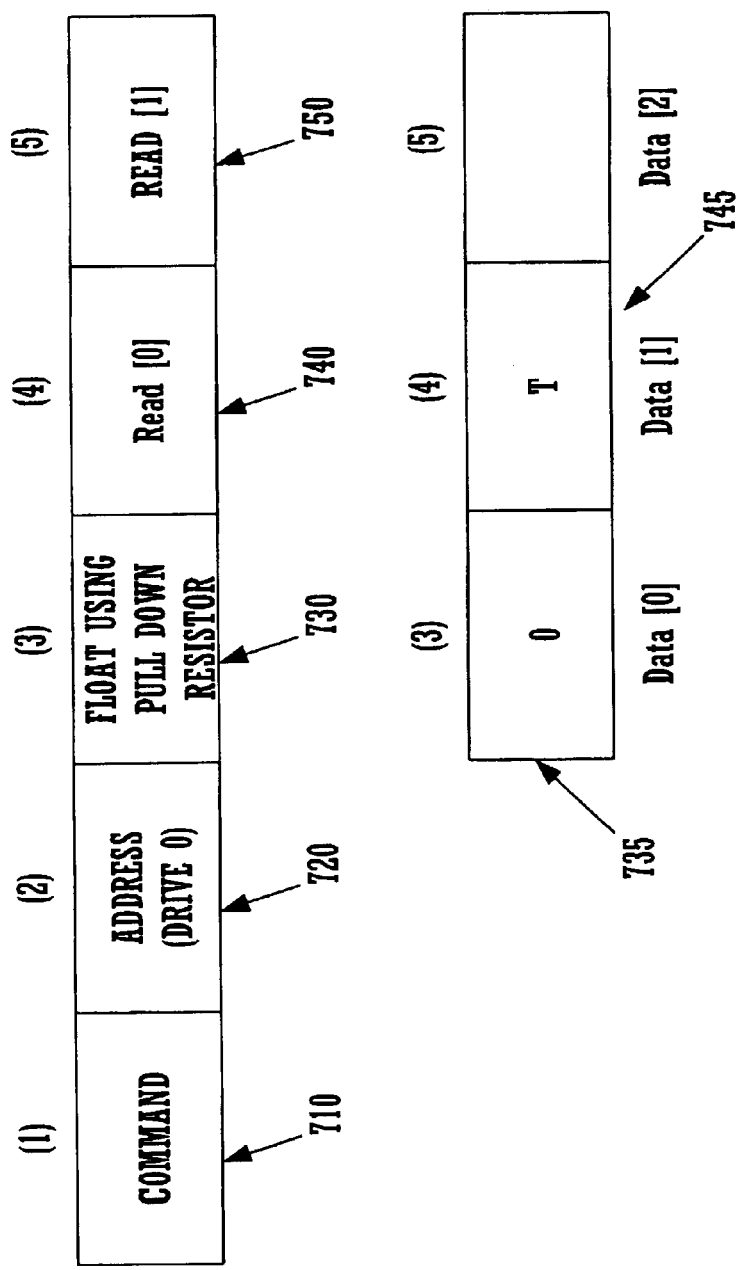
FIG. 7 is a block diagram of signal waveforms of an SPI interface in accordance with an embodiment of the present invention.

FIG. 7 is a block diagram that illustrates SPI bus values for the only erroneous case in systems that support small and large SPI EEPROMs. In this case, a small EEPROM with a zero value present in its first byte also has a valid tag value in its second byte. The controller cannot distinguish between this case and a valid large EEPROM.

The SPI controller 105 issues the command, a READ command, in the first byte (1) 710 in the present embodiment. The SPI controller 105 then issues the first 8 bits of the address (00000000) in the second byte (2) 720.

At byte (3) 730, the small EEPROM outputs a zero byte, as shown by data 735. This also would be the same response as if a large EEPROM were attached. A large EEPROM would be still receiving the second address byte during this time wherein the pulldown resistor correspondingly pulls the bus down low. At byte (4) 740, the controller assumes it is reading the first byte of a large EEPROM while in fact it is reading the second tag byte, data 745, of the attached small EEPROM. If this second byte has one of the pre-defined non-zero "tag" values, the controller continues reading data at byte (5) 750. However, the controller will always be reading one byte behind because of the address/data anomaly occurring during byte (3) 730.

This case is easy to avoid by adhering to the previously stated rule of always placing a non-zero tag byte as the first byte of the EEPROM no matter the size of the EEPROM in accordance with one embodiment of the present invention.

If the USB system using the SPI controller is designed also to program a new EEPROM, it is advisable to enumerate using the internal controller values so that special programming firmware may be loaded for programming a connected SPI EEPROM. In this case it is important that the EEPROM to be programmed does not contain the pattern shown in FIG. 7, namely a zero value in the first byte and a valid tag in the second byte. Commercially available EEPROMs are delivered in an "erased" state, which may correspond to an arbitrary data value (such as all 0×00 value or all 0×FF values). Since all data values in a "virgin" EEPROM are the same, the undesirable pattern shown in FIG. 7 cannot occur, and the system will load the proper firmware to program the EEPROM.

Alternately, a switch may be provided that disables the SPI interface during chip initialization, forcing the chip to enumerate from internal fixed values. This causes the programming firmware driver to be loaded, after which time the SPI interface can be switched on to allow the internal processor and firmware to program the EEPROM.

SPI EEPROMs come in densities that exceed 64 Kilobytes (16 address bits). The larger SPI EEPROMs have addresses that exceed the 16 address bits of the previously mentioned large EEPROM. For example, the Silicon Storage Technology SST45VF020 contains 2 Megabits (256 Kilobytes) of data.

These larger EEPROMs extend the address space by inserting a third address byte, during SCK clocks 24–31. To extend the detection method as used in FIG. 5 to accommodate the larger address devices, the controller 105 simply outputs three address bytes: the first byte driven to zero; and the second and third bytes floated but pulled down to zero as before. A sensing circuit in the controller 105 will detect a non-zero byte after the three address bytes in accordance with one embodiment of the present invention.

Referring back to FIG. 6, assuming an EEPROM with three address bytes is coupled to the SPI interface circuit, the controller 105 checks for a non-zero byte during the fifth byte (5) 650. The three address byte EEPROM will send a non-zero tag byte in byte (5) 650. A sensing circuit in the controller 105 detects the presence of the non-zero tag byte which indicates that a three byte address EEPROM is connected. Accordingly, the controller 105 has the intelligence to recognize the fifth byte (5) 650 as the first EEPROM byte of data which can be properly processed by the memory controller 105.

In still another embodiment of the present invention, the controller has the intelligence to recognize whether a small EEPROM (512 byte), large EEPROM (1–64 kilobytes), or larger three address bytes EEPROM, as well as the absence of any EEPROM by checking for a non-zero byte during byte (3) 630, byte (4) 640, and byte (5) 650 as illustrated in FIG. 6. The method can be extended for as many bytes as required to accommodate larger and larger SPI devices.

FIG. 8 illustrates a flow chart of steps for process 800 in accordance with the automatic detection of memory size for an SPI device. Process 800 can be implemented with SPI interface circuit 400 to detect the memory size and/or presence of any SPI device in accordance with an embodiment of the present invention.

Process 800 follows the three stages to read information from the SPI device as discussed previously. These three stages are the command stage, the address stage, and the data stage. Process 800 begins with step 810, the command stage, where a memory controller sends the READ command byte in the first byte of data over the bi-directional bus.

Continuing with process 800, the address stage begins in step 820 where the memory controller drives the data Input/Output (D-IO) pin low for the second byte. Then, the controller floats the D-IO pin in step 830. Again, as discussed previously, the presence of the resistor in the SPI interface circuit will continue to pull the D-IO pin in the controller to a logic "0" level until the presence of a non-zero value coming from the SPI device, as is shown in step 840.

In step 850 of process 800, the memory controller has the intelligence to detect the presence of a zero and non-zero byte values coming over the D-IO pin in the controller in order to determine the memory size of the SPI device attached to the controller, or even to determine the absence of the SPI device. For example, if a non-zero value, such as a non-zero tag byte, is detected in the third byte over the bi-directional data line, then the controller has the intelligence to recognize that a small SPI EEPROM is connected. Alternatively, if a zero value is detected in the third byte and a non-zero value is detected in the fourth byte, a large SPI EEPROM is connected. Similarly, if zero values are detected for the second and third bytes and a non-zero value is detected in the fifth byte, a three byte address EEPROM is connected. Depending on the system, this process can be extended to larger and larger SPI devices.

Furthermore, in step 850 of process 800, the controller has the intelligence to detect the absence of an SPI device depending on the system. If the system supports only small and large EEPROMs, then the controller has the intelligence to understand that continued zero byte values at and beyond the fourth byte of data over the bi-directional bus indicate the absence of an SPI device. This method can be extended to accommodate systems that support larger EEPROMs, such as the three address byte EEPROM.

While the methods of embodiments illustrated in process 800 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

The preferred embodiment of the present invention, a method and system for automatic detection the memory size of an attached SPI device, is thus described. While the present invention has been described in particular embodiments, it should be appreciated that the present invention should not be construed as limited by such embodiments, but rather construed according to the below claims.

What is claimed is:

1. A method of automatically detecting memory size comprising the steps of:

a) sending a READ command from a memory controller chip to a serial peripheral interface (SPI) device over an SPI interface for a first series of eight serial clock cycles;

b) driving a data Input/Output (D-IO) pin in said memory controller chip low for a second series of eight serial clock cycles;

c) floating said D-IO pin after said second series of eight serial clock cycles, such that said D-IO pin is weakly pulled down in the absence of data from said SPI device and is overcome in the presence of data from said SPI device;

d) automatically determining that said SPI device has memory addresses of up to nine bits when detecting the presence of a first non-zero value coming from said SPI device through said D-IO pin during a third series of eight serial clock cycles; and e) automatically determining that said SPI device has memory addresses of up to sixteen bits when detecting the presence of a first zero value at said D-IO pin during said third series of eight serial clock cycles and a second non-zero value coming from said SPI device through said D-IO pin during a fourth series of eight serial clock cycles.

2. A method as described in claim 1, wherein said SPI device having memory addresses of up to nine bits is an EEPROM having up to five hundred twelve (512) bytes of memory.

3. A method as described in claim 1, wherein said SPI device having memory addresses of up to sixteen bits is an EEPROM having up to 64 kilobytes of memory.

4. A method as described in claim 1, wherein steps d) and e) are performed by a sensing circuit located within said memory controller chip.

5. A method as described in claim 1, wherein said memory controller chip drives a serial clock signal between said memory controller chip and said SPI device.

6. A method as described in claim 1, wherein said SPI device has a non-zero value located at its first address byte.

7. A method as described in claim 1, wherein said SPI interface uses three controller pins at said memory controller chip including a serial clock pin, a chip select pin, and said D-IO pin that is coupled to a serial input (SI) and serial output (SO) pin on said SPI device, said SI and SO pins coupled to form a bi-directional signal, said SI and SO pins also coupled to a pulldown resistor, said pulldown resistor pulling down said D-IO pin in order to float said D-IO pin to a logic "0" level as described in step c).

8. A method as described in claim 1, wherein zero values for said third and fourth series of eight serial clock cycles indicate the absence of said SPI device.

9. A method as described in claim 1, wherein said SPI device having larger memory is detected comprising the further step of:
automatically detecting the presence of said first zero value at said D-IO pin during said third series of eight serial clock cycles, a second zero value at said D-IO pin during said fourth series of eight serial clock cycles, and a third non-zero value coming from said SPI device through said D-IO pin during a fifth series of eight serial clock cycles with said sensing circuit indicating that said SPI device memory addresses of up to twenty-four bits.

10. A method as described in claim 1, wherein step c) further comprises pulling down said D-IO pin, that is floated, to a logic "0" level with a pulldown resistor, said pulldown resistor coupled to said D-IO pin, a serial input (SI) pin, and a serial output (SO) pin of said SPI device.

11. A serial peripheral interface (SPI) circuit for automatically detecting memory size comprising:
a memory controller chip comprising a first serial clock pin for providing a clock signal, a data Input/Output (D-IO) pin, and a first chip select pin for sending a chip select signal;
an SPI device comprising a second serial clock pin for receiving said clock signal, a serial input pin (SI) coupled to a serial output (SO) pin, and a second chip select pin for receiving said chip select signal;
a pulldown resistor coupled to said SI and SO pins;
a sensing circuit for detecting data signals coming from said SPI device;
means for coupling said SPI device to said memory controller chip, said sensing circuit, and to said pulldown resistor; and
means for detecting memory size of said SPI device.

12. An SPI interface circuit as described in claim 11, wherein said means for coupling comprises:
means for coupling said first and second serial clock pins;
means for coupling said D-IO pin to said SI pin, to said SO pin, and to said pulldown resistor; and
means for coupling said first and second chip select pins.

13. An SPI interface circuit as described in claim 11 further comprising:
means for coupling said SI and SO pins to form a single bi-directional signal; and
means for coupling said SI and SO pins to said pulldown resistor.

14. An SPI interface circuit as described in claim 11, wherein said means for detection comprises:
a) means for sending a READ command from said memory controller chip to said SPI device over said SPI interface circuit for a first series of eight serial clock cycles;
b) means for driving said data Input/Output (D-IO) pin in said memory controller chip low for a second series of eight serial clock cycles;
c) means for floating said D-IO pin and weakly pulling down said D-IO pin with said pulldown resistor to a logic "0" level after said second series of eight clock cycles, such that the D-IO pin is weakly pulled down in the absence of data from the SPI device and is overcome with the presence of data from the SPI device;
d) means for automatically determining that said SPI device has memory addresses of up to nine bits when detecting the presence of a first non-zero value coming from said SPI device through said D-IO pin during a third series of eight serial clock cycles with said sensing circuit; and
e) means for automatically determining that said SPI device has memory addresses of up to sixteen bits when detecting the presence of a first zero value during said third series of eight serial clock cycles with said sensing circuit.

15. An SPI interface circuit as described in claim 11, wherein said means for detection comprises:
a) means for sending a READ command from said memory controller chip to said serial peripheral interface (SPI) device over said SPI interface circuit for a first series of eight serial clock cycles;
b) means for driving said data Input/Output (D-IO) pin in said memory controller chip low for a second series of eight serial clock cycles;
c) means for floating said D-IO pin and weakly pulling down said D-IO pin with said pulldown resistor to a logic "0" level;
d) means for automatically determining that said SPI device has memory addresses of up to nine bits when detecting the presence of a first non-zero value coming from said SPI device through said D-IO pin during a third series of eight serial clock cycles with said sensing circuit;
e) means for automatically determining that said SPI device has memory addresses of up to sixteen bits when detecting the presence of a first zero value coming from said SPI device through said D-IO pin during said third series of eight serial clock cycles with said sensing circuit and a second non-zero value coming from said SPI device through said D-IO pin during a fourth series of eight serial clock cycles with said sensing circuit; and
f) means for automatically determining that said SPI device has memory addresses of up to twenty-four bits when detecting the presence of said first zero value coming from said SPI device through said D-IO pin during said third series of eight serial clock cycles, a second zero value during a fourth series of eight serial clock cycles, and a third non-zero value coming from said SPI device through said D-IO pin during a fifth series of eight serial clock cycles with said sensing circuit.

16. An SPI interface circuit as described in claim 11, wherein said SPI device has a non-zero value located at its first address byte.

17. An SPI interface circuit as described in claim 11, wherein zero values for said third, fourth, and fifth series of eight serial clock cycles indicate the absence of said SPI device, wherein said memory controller chip instructs a USB chip coupled to said memory controller chip to enumerate using internal values.

18. A system comprising a processor and a memory unit, wherein said memory unit contains instructions that when executed implement a method of automatically detecting memory size comprising the steps of:
   a) sending a READ command from a memory controller chip to a serial peripheral interface (SPI) device over an SPI interface for a first series of eight serial clock cycles;
   b) driving a data Input/Output (D-IO) pin in said memory controller chip low for a second series of eight serial clock cycles;
   c) floating said D-IO pin after said second series of eight serial clock cycles, such that said D-IO pin is weakly pulled down in the absence of data from said SPI device and is overcome in the presence of data from said SPI device;
   d) automatically determining that said SPI device has memory addresses of up to nine bits when detecting the presence of a first non-zero value coming from said SPI device through said D-IO pin during a third series of eight serial clock cycles; and
   e) automatically determining that said SPI device has memory addresses of up to sixteen bits when detecting the presence of a first zero value at said D-IO pin during said third series of eight serial clock cycles, and a second non-zero value coming from said SPI device through said D-IO pin during a fourth series of eight serial clock cycles.

19. A system as described in claim 18, wherein said SPI device having memory addresses of up to nine bits is an EEPROM having up to five hundred twelve (512) bytes of memory.

20. A system as described in claim 18, wherein said SPI device having memory addresses of up to sixteen bits is an EEPROM having up to 64 kilobytes of memory.

21. A system as described in claim 18, wherein steps d) and e) are performed by a sensing circuit located within said memory controller chip.

22. A system as described in claim 18, wherein said memory controller chip drives a serial clock signal between said memory controller chip and said SPI device.

23. A system as described in claim 18, wherein said SPI device has a non-zero value located at its first address byte.

24. A system as described in claim 18, wherein said SPI interface uses three controller pins at said memory controller chip including a serial clock pin, a chip select pin, and said D-IO pin that is coupled to a serial input (SI) and serial output (SO) pin on said SPI device, said SI and SO pins coupled to form a bi-directional signal, said SI and SO pins also coupled to a pulldown resistor, said pulldown resistor pulling down said D-IO pin in order to float said D-IO pin to a logic "0" level as described in step c).

25. A system as described in claim 18, wherein zero values for said third and fourth series of eight serial clock cycles indicate the absence of said SPI device.

26. A system as described in claim 18, wherein said SPI device having larger memory is detected comprising the further step of:
   automatically detecting the presence of said first zero value at said D-IO pin during said third series of eight serial clock cycles, a second zero value at said D-IO pin during said fourth series of eight serial clock cycles, and a third non-zero value coming from said SPI device through said D-IO pin during a fifth series of eight serial clock cycles with said sensing circuit indicating that said SPI device memory addresses of up to twenty-four bits.

27. A system as described in claim 18, wherein step c) further comprises pulling down said D-IO pin, that is floated, to a logic "0" level with a pulldown resistor, pulldown resistor coupled to said D-IO pin, a serial input (SI) pin, and a serial output (SO) pin of said SPI device.

* * * * *